United States Patent [19]

Mackoway

[11] 4,095,909
[45] Jun. 20, 1978

[54] CARTRIDGE PIN MOUNTING

[75] Inventor: John P. Mackoway, East Peoria, Ill.

[73] Assignee: Caterpillar Tractor Co., Peoria, Ill.

[21] Appl. No.: 814,374

[22] Filed: Jul. 11, 1977

[51] Int. Cl.² .............................................. F16C 11/00
[52] U.S. Cl. ...................................... 403/14; 403/155; 74/251 R; 305/58 R
[58] Field of Search .................. 403/155, 154, 13, 14, 403/326; 74/251 R, 251 C, 255 R, 256; 305/11, 58 R, 59

[56] References Cited

U.S. PATENT DOCUMENTS

| 1,392,819 | 10/1921 | Davis | 403/155 |
| 1,478,733 | 12/1923 | Cave | 403/155 X |
| 2,661,228 | 12/1953 | Wilson | 403/155 |
| 2,699,974 | 1/1955 | Deffenbaugh | 305/58 X |
| 2,823,081 | 2/1958 | Mayo | 305/59 X |
| 3,832,018 | 8/1974 | Boggs | 74/255 R |
| 3,888,597 | 6/1975 | Datta | 403/326 |

*Primary Examiner*—Andrew V. Kundrat
*Attorney, Agent, or Firm*—Wegner, Stellman, McCord, Wiles & Wood

[57] ABSTRACT

A cartridge pin mounting wherein a cartridge pin is secured in accurately preselected relationship to a frame having a mounting hole opening through an outer surface thereof. An outer surface associated with the pin is urged into flush relationship with the outer surface of the frame by a retainer which, in turn, is locked in the frame opening by a suitable locking ring. The outer surface of the pin may be defined by a ring structure at the outer end of the pin, and in the illustrated embodiment, the pin projects slightly from the ring portion.

9 Claims, 1 Drawing Figure

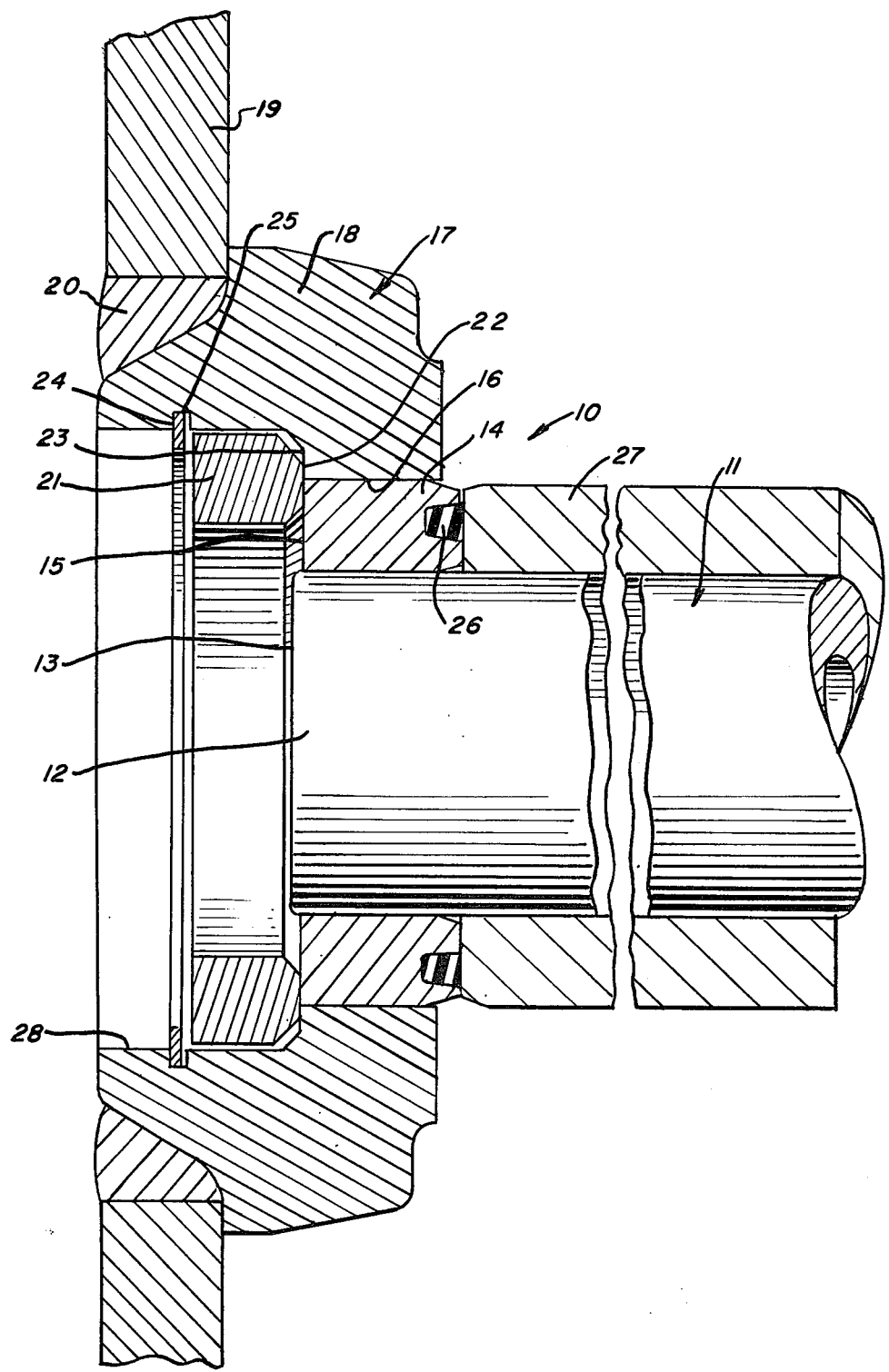

CARTRIDGE PIN MOUNTING

BACKGROUND OF THE INVENTION

1. Field of the Invention

This invention relates to pin mounting means and in particular to means for mounting a cartridge pin or the like in a frame.

2. Description of the Prior Art

At times it is necessary to install a pin, such as a cartridge pin, within a frame member. It is difficult in many installations to determine when the pin is fully installed in the hole of the frame member such as where associated apparatus is disposed adjacent the opening.

It is, therefore, desirable to provide some means for pressing a cartridge pin or the like into an opening in a frame so as to dispose the pin automatically at a preselected inserted disposition notwithstanding substantial inaccessibility to the opening, such as for viewing purposes.

SUMMARY OF THE INVENTION

The present invention comprehends an improved cartridge pin mounting structure wherein the pin is provided with surface means defining an outwardly facing longitudinally outer end surface and a radially outer surface complementary to the mounting hole of the frame.

The surface means is installed in the mounting hole of the frame with the outer end surface thereof flush with the frame outer end surface through which the mounting hole opens. Thus, the pin is automatically mounted in a preselected accurate relationship to the frame mounting hole.

The invention comprehends providing a press ring for urging the surface means carried by the pin to a flush disposition with the outer surface of the frame portion defining the mounting hole. The press ring may be retained in abutment with the pin surface means and the frame outer surface so as to maintain the pin in the desired inserted disposition.

The retaining means may be locked in the frame opening by a suitable snap ring or the like, permitting facilitated removal of the retaining means and pin when desired.

In the illustrated embodiment, the surface means comprises a ring mounted to the outer end of the pin. The surface means ring may be provided with a seal such as for sealing the ring to a bushing in which the pin is received.

The surface means ring may be press-fitted to the outer end of the pin and the distal end surface of the pin may be disposed as desired relative to the outer surface of the surface means ring.

Thus, the pin may be blindly driven into the frame mounting hole until the press ring abuts the frame outer surface, thereby providing an automatic indication to the installer that the pin is properly disposed in the frame.

The cartridge pin mounting of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein the drawing is a fragmentary vertical section illustrating a cartridge pin mounting embodying the invention.

DESCRIPTION OF THE PREFERRED EMBODIMENT

In the exemplary embodiment of the invention as disclosed in the drawing, a cartridge pin mounting generally designated 10 includes a cartridge pin 11 defining an outer end 12 terminating in a planar end surface 13. The pin outer portion 12 is provided with a surface means 14 comprising a ring press-fitted to the pin portion 12. In the illustrated embodiment, the pin surface 13 is disposed slightly outwardly of the outer surface 15 of ring 14.

Ring 14 is adapted to be pressed into an opening 16 provided in a frame 17. The frame portion 18 defining the opening may be secured to a main portion 19 of the frame by suitable means, such as welding 20.

As indicated briefly above, the invention comprehends the installation of the pin 11 in the frame opening 16 by an effectively blind mounting of the ring 14 in the opening so as to dispose the pin automatically in the disposition of the drawing. To effect such positioning, a press ring 21 is provided having an inner press surface 22 which engages the outer surface 15 of ring 14 for urging the ring 14 and pin 11 axially inwardly through the frame opening 16 until the press ring surface 22 abuts the outer surface 23 through which the frame opening 16 opens. As the pin 11 is fixedly associated with the ring 14, the accurate disposition of the outer surface 15 of ring 14 in coplanar relationship with the outer surface 23 of the frame portion defining opening 16 automatically accurately positions the pin 11 in the opening 16.

Pin 11 may be retained against axial outward movement from the opening subsequent to the installation thereof by a removable locking ring 24 disposed outwardly of press ring 21 and received in a suitable annular groove 25 in the frame portion 18. In the illustrated embodiment, the locking ring 24 comprises a split snap ring, it being obvious to those skilled in the art that any suitable removable locking means may be employed for the purpose.

As further shown in the drawing, ring 14 may be provided with a suitable seal 26 for sealingly engaging a bushing 27 receiving the pin 11 in the installed arrangement.

Alternatively, the ring 14 may be driven to the flush disposition of the drawing by a suitable tool and the ring 21 installed subsequently to serve solely as a retainer to maintain the installed disposition of the pin.

Thus, it may be seen that the pin 11 may be installed accurately in the frame 17 without the need for observation of the disposition of the pin as the installing method automatically insures that the pin will be installed accurately in the desired position of the drawing.

As shown in the drawing, the opening 16 is provided with a counterbore portion 28 defining the surface 23 and the groove 25 and adapted to freely receive the ring 21 for facilitated installation thereof.

In the illustrated embodiment, the end surface 13 of pin 11 is disposed slightly inwardly of the ring surface 15. As will be obvious to those skilled in the art, surface 13 may be disposed as desired relative to the ring 14 and, thus, the surface 13 may be flush with surface 15 or disposed inwardly thereof if desired.

The foregoing disclosure of specific embodiments is illustrative of the broad inventive concepts comprehended by the invention.

The embodiments of the invention in which an exclusive property or privilege is claimed are defined as follows:

1. A cartridge pin mounting wherein a cartridge pin is secured in accurately preselected relationship to a frame portion having a mounting hole opening outwardly through an outer surface thereof, said mounting comprising: surface means on said pin defining an outwardly longitudinally facing outer end surface and a radially outer peripheral surface complementary to said mounting hole, said surface means being installed in said mounting hole with said outer end surface flush with said frame outer surface to provide a preselected accurate mounting of said pin in said frame portion hole; and retaining means on said frame portion longitudinally outwardly of said frame outer surface for maintaining the surface means against undesirable longitudinally outward displacement and thereby maintain the flush disposition of said surface means outer end surface and said frame outer surface.

2. The cartridge pin mounting of claim 1 wherein said retaining means comprises a press member adapted to urge said surface means outer end surface longitudinally inwardly into the flush disposition relative to said frame outer surface, and a locking member removably mounted to the frame longitudinally outwardly of said press member for maintaining said press member in installed retaining disposition relative to said surface means inner end surface.

3. The cartridge pin mounting of claim 1 wherein said surface means comprises a collar fixedly carried on said pin.

4. The cartridge pin mounting of claim 1 wherein said surface means comprises an annular member fixedly secured to the outer end of the pin.

5. The cartridge pin mounting of claim 1 wherein said pin includes an outer end portion projecting longitudinally outwardly of said surface means.

6. The cartridge pin mounting of claim 1 further including a bushing receiving said pin longitudinally inwardly of the surface means and said surface means is provided with seal means for sealing said surface means to the bushing.

7. The cartridge pin mounting of claim 1 wherein said retaining means comprises a press member adapted to urge said surface means outer end surface longitudinally inwardly into the flush disposition relative to said frame outer surface, and a locking member for maintaining said press member in retaining disposition relative to said surface means inner end surface, said locking member comprising a snap ring removably secured to said frame longitudinally outwardly of said press member.

8. The cartridge pin mounting of claim 1 wherein said pin defines a planar outer end surface spaced from the plane of said frame outer surface when said surface means outer end surface is disposed flush with said frame outer surface.

9. The cartridge pin mounting of claim 1 wherein said surface means comprises a ring press-fitted to said pin.

* * * * *